US005130037A

United States Patent [19]

Swiatowski et al.

[11] Patent Number: 5,130,037

[45] Date of Patent: Jul. 14, 1992

[54] PROCESS FOR THE FROTH FLOTATION OF OXIDE AND SALT TYPE MINERALS AND COMPOSITION

[75] Inventors: Piotr Swiatowski, Huddinge; Anne Andersen, Skarhamn; Annelie Askenbom, Stenungsund, all of Sweden

[73] Assignee: Berol Nobel AB, Stenungsund, Sweden

[21] Appl. No.: 504,782

[22] Filed: Apr. 4, 1990

[51] Int. Cl.[5] .......................... C09K 3/00; B03D 1/14

[52] U.S. Cl. .......................... 252/61; 209/166; 209/167; 252/191; 252/194

[58] Field of Search .......................... 252/61, 191, 194; 209/166, 167

[56] References Cited

U.S. PATENT DOCUMENTS 4,171,261 10/1979 Dorrepaal et al. .................. 252/61
4,430,238 2/1984 Hellsten et al. .................. 252/61
4,514,290 4/1985 Swiatkowski et al. .................. 252/61

FOREIGN PATENT DOCUMENTS 1567620 12/1976 United Kingdom .

*Primary Examiner*—A. Lionel Clingman

*Assistant Examiner*—William S. Parks

[57] ABSTRACT

A process is provided for the froth flotation of oxide and salt type minerals utilizing as the collector a combination of a monoester of a dicarboxylic acid of the general formula $$\text{R'}\underset{\underset{\text{O}}{\|}}{\text{C}}\text{OA}\underset{\underset{\text{O}}{\|}}{\text{C}}\text{R''}\underset{\underset{\text{O}}{\|}}{\text{C}}\text{OH} \qquad \text{I}$$

in which R' is an aliphatic hydrocarbon group with 7–21 carbon atoms, R" is a hydrocarbon radical with 2–6 carbon atoms and A is an alkylene oxide group derived from an alkylene oxide with 2–4 carbon atoms; and a monocarboxylic acid having the general formula $$\text{R'''COOH} \qquad \text{II}$$

wherein R''' is a hydrocarbon group with 5–23 carbon atoms, the acid as being in an amount to increase the yield and/or the selectivity of the monoester in the flotation of alkaline earth metal-containing oxide and salt type minerals, such as apatite, fluorspar, calcite, baryte, scheelite, dolomite, and magnesite.

26 Claims, No Drawings

PROCESS FOR THE FROTH FLOTATION OF OXIDE AND SALT TYPE MINERALS AND COMPOSITION

Monocarboxylic aliphatic acids such as conventional fatty acids are used as collectors for the froth flotation of apatite. However, these collectors exhibit low selectivity for the valuable mineral.

Swedish Patent Publication No. 417 477 and U.S. Pat. No. 2,099,120 suggest as collectors for the flotation of minerals such as apatite and fluorspar compounds which have the general formula:

$$R'(OC_2H_4)_nO\underset{\underset{O}{\|}}{C}R''\underset{\underset{O}{\|}}{C}OH$$

in which R' is an alkyl group with 8–18 carbon atoms, R'' is a hydrocarbon radical with 2–6 carbon atoms and n is a number between 0 and 10. However, these compounds cause large quantities of froth to form, which requires that the flotation be carried out in the presence of an active anti-foaming additive such as fuel oil.

U.S. Pat. No. 4,430,238, patented Feb. 7, 1984, to Hellsten and Klingberg, Swedish patent publication No. 447,066, discloses that another type of esterified dicarboxylic acid is not only a selective collector reagent for oxide minerals, but also produces only moderate quantities of froth. Accordingly, this compound can be used in froth flotation either in conjunction with small quantities of anti-foaming additives or, in certain cases, in the absence of any such additives.

These compounds are monoesters of dicarboxylic acids, and have the general formula $$R'\underset{\underset{O}{\|}}{C}OA\underset{\underset{O}{\|}}{C}R''\underset{\underset{O}{\|}}{C}OH$$

in which R' is an aliphatic hydrocarbon group with 7–21 carbon atoms, R'' is a hydrocarbon radical with 2–6 carbon atoms and A is an oxyalkylene group derived from an alkylene oxide with 2–4 carbon atoms. Particularly preferred are compounds in which A denotes a group derived from ethylene oxide and in which R'' is —CH=CH— or the phenylene group $—CH_6H_4—$.

The group $$R'\overset{\overset{O}{\|}}{C}—$$

is derived from carboxylic acids such as 2-ethylhexanoic acid, caprylic acid, capric acid, lauric acid, myristic acid, palmitic acid, stearic acid, oleic acid, ricinoleic acid, linoleic acid, linolenic acid, abietic acid and dehydroabietic acid. Particularly preferred are the unsaturated carboxylic acids. R'' is preferably derived from a dicarboxylic acid such as oxalic acid, succinic acid, glutaric acid, adipic acid, maleic acid, citraconic acid, terephthalic acid and phthalic acid.

While these diesters have the ability to selectively enrich oxide minerals, such as apatite, during the froth flotation process, this property can be further reinforced by the addition of a hydrophobic secondary collector reagent in the form of a polar, water-insoluble substance with an affinity for the mineral particles coated by the esterified dicarboxylic acid. Esterified dicarboxylic acid in accordance with the Hellsten invention is usually added at a level of between 10 and 1,500, but preferably 50–800, grams per ton of ore, and the polar, water-soluble substance at a level of between 0 and 1,000 grams, but preferably 5–750 grams, per ton of ore. In the event of both the esterified dicarboxylic acid and the hydrophobic substance being used, their relative proportion may vary within wide limits, but will usually lie within the range 1:10–20:1, and will preferably lie within the range 1:5–5:1.

The polar, water-insoluble secondary collector reagent is preferably in the form of an alkylene oxide adduct of the general formula $$R'''(A)_{p1}OH$$

in which R''' denotes a hydrocarbon group, preferably an aliphatic group, or an alkylaryl group with 8–22 carbon atoms, A denotes an oxyalkylene group derived from an alkylene oxide with 2–4 carbon atoms and $p_1$ is a number between 1 and 6; or it may be in the form of an ester compound of the general formula $$R''''\underset{\underset{O}{\|}}{C}O(A)_{p2}Y$$

in which R'''' denotes a hydrocarbon group with 7–21 carbon atoms, A denotes an alkyleneoxy group derived from an alkylene oxide with 2–4 carbon atoms, $p_2$ denotes a number between 0 and 6 and Y denotes an alkyl group with 1–4 carbon atoms or hydrogen.

In addition to their advantageous flotation effect, these preferred secondary collector reagents also have a favourable effect on foaming, since they produce a foam of acceptable stability in combination with the esterified dicarboxylic acid in accordance with the present invention.

In accordance with the present invention, it has now been determined that the yield and/or the selectivity of the froth flotation with the monoester of a dicarboxylic acid of U.S. Pat. No. 4,430,238 can be further improved by the use in conjunction therewith of a monocarboxylic acid having the general formula $$R'''COOH$$

wherein R''' is a hydrocarbon group with 5–23 carbon atoms, the acid being in an amount to increase the yield and/or the selectivity of the monoesters in the flotation of alkaline earth metal-containing oxide and salt type minerals such as apatitie, fluorspar, calcite, baryte, scheelite, dolomite, and magnesite.

The invention accordingly provides a froth flotation collector composition comprising, in combination:

(1) a monoester of a dicarboxylic acid of the general formula $$R'\underset{\underset{O}{\|}}{C}OA\underset{\underset{O}{\|}}{C}R''\underset{\underset{O}{\|}}{C}OH$$

in which R' is an aliphatic hydrocarbon group with 7–21 carbon atoms, R'' is a hydrocarbon radical with 2–6 carbon atoms and A is an alkylene oxide group derived from an alkylene oxide with 2–4 carbon atoms; and (2) a monocarboxylic acid having the general formula $R'''COOH$ wherein R''' is a hydrocarbon group with 5-23 carbon atoms, the acid being in an amount to increase the yield and/or the selectivity of the monoester in the flotation of alkaline earth metal-containing oxide and salt type minerals.

The weight ratio of the monoesterified dicarboxylic acid to the monocarboxylic acid is within the range from 1:15 to 9:1, preferably from 1:7 to 6:1. The amount of monocarboxylic acid to improve yield and/or selectivity is selected within these weight ratio ranges.

The invention further provides a process for the froth flotation of oxide minerals and salt minerals which comprises carrying out the froth flotation in the presence as a collector reagent of:

(1) a monester of a carboxylic acid having the general formula $$R'\overset{\overset{O}{\|}}{C}OA\overset{\overset{O}{\|}}{C}R''\overset{\overset{O}{\|}}{C}OH$$

in which R' is aliphatic hydrocarbon having from seven to twenty-one carbon atoms, R'' is hydrocarbon having from two to six carbon atoms, and A is oxyalkylene having from two to four carbon atoms; and (2) a monocarboxylic acid having the general formula $R'''COOH$ wherein R''' is a hydrocarbon group with 5-23 carbon atoms, the acid being in an amount to increase the yield and/or the selectivity of the monoester in the flotation.

The weight ratio of the monoesterified dicarboxylic acid to the monocarboxylic acid is within the range from 1:15 to 9:1, preferably from 1:7 to 6:1.

In this process, the total amount employed of the monoester of dicarboxylic acid and of the monocarboxylic acid is suitably from 25 to 1000 grams, preferably from 50 to 500 grams, per ton of mineral being subjected to the froth flotation.

These monoesters of dicarboxylic acids can be prepared by the process described in U.S. Pat. No. 4,430,238, column 1, lines 63 et seq.

Preferred monoesters of dicarboxylic acids having the general formula (I) are those in which the group $$R'\overset{\overset{O}{\|}}{C}—$$

is derived from aliphatic and cycloaliphatic carboxylic acids, which can be saturated or unsaturated, such as 2-ethylhexanoic acid, caprylic acid, capric acid, lauric acid, myristic acid, palmitic acid, stearic acid, oleic acid, ricinoleic acid, linoleic acid, linolenic acid, abietic acid, and dehydroabietic acid. Particularly preferred are the unsaturated aliphatic carboxylic acids.

R'' is preferably derived from a dicarboxylic acid such as succinic acid, glutaric acid, adipic acid, maleic acid, citraconic acid, terephthalic acid, and phthalic acid. Most preferred are esterified dicarboxylic acids in which A is a group derived from ethylene oxide and R'' is —CH═CH— or the phenylene group $—C_6H_4—$.

Preferred monocarboxylic acids of formula (II) include for example 2-ethylhexanoic acid, caprylic acid, capric acid, lauric acid, myristic acid, palmitic acid, stearic acid, oleic acid, ricinoleic acid, linoleic acid, linolenic acid, abietic acid, and dehydroabietic acid. Particularly preferred are unsaturated monocarboxylic acids, and monocarboxylic acids containing from 10 to 18 carbon atoms.

As earlier mentioned, the basic combinations of two collectors I and II according to the invention exhibit an excellent ability to selectively enrich alkaline earth metals in high yields. This ability may be further improved by the addition of a hydrophobic secondary collector as disclosed in U.S. Pat. No. 4,430,238, starting at column 2, line 33, in the form of a polar, preferably nonionic, water-insoluble substance with an affinity for the mineral particles coated by the monoester of dicarboxylic acid and monocarboxylic acid. The hydrophobic secondary collector is usually added in an amount within the range from 0 to about 1000 grams, preferably from about 5 to about 750 grams, per ton of ore. The ratio of the monoester dicarboxylic acid and monocarboxylic acid to the secondary collector usually lies within the range from about 1:10 to about 20:1.

The polar water-insoluble secondary collector is preferably (a) an alkylene oxide adduct of the general formula $R''''(A)_{p1}OH$ wherein R'''' is a hydrocarbon group, preferably an aliphatic group or an alkylaryl group having from about 8 to about 22 carbon atoms, A is an oxyalkylene group derived from an alkylene oxide having 2 to 4 carbon atoms, and $p_1$ is a number from 1 to 6; or (b) an ester of the general formula $$R'''''\overset{\overset{O}{\|}}{C}O(A)_{p2}Y$$

wherein R''''' is an aliphatic hydrocarbon group having from about 7 to about 21 carbon atoms, A is an alkyleneoxy group derived from an alkylene oxide having from 2 to 4 carbon atoms, $p_2$ is a number from 0 to 6, and Y is an alkyl group having from 1 to about 4 carbon atoms or hydrogen, provided that Y cannot be hydrogen when $p_2$ is zero.

In addition to their advantageous froth flotation effect, these preferred secondary collectors also have a favourable effect on foaming, since they produce a foam of acceptable stability when using the combination of monoester or dicarboxylic acid and monocarboxylic acid in accordance with the invention.

In the process according to the invention, it is also possible as disclosed in U.S. Pat. No. 4,430,238, column 3, starting at line 13, to add pH-regulation substances, such as sodium carbonate and sodium hydroxide, as well as depressants and activating substances. In the majority of froth flotation processes the separation is influenced by the pH-value of the pulp. The froth flotation process of the invention is also dependent on the pH-value, which should be alkaline, and preferably within the range from about 8 to about 10. Previously disclosed foaming agents may also be added, if desired.

Preferred embodiments of the process and compositions of the invention are shown by the following examples.

EXAMPLES 1 TO 3

An apatite ore (fluorapatite) containing 14.6% $P_2O_5$ as well as gangue minerals and iron oxides, and ground to such a particle size that 80% by weight passed through a 74 μm screen, was introduced in an amount of 1 kg together with 1.5 liter of water into a 3-liter flotation cell. Thereafter 0.45 g water glass in the form of a 40% solution was added and the pulp was conditioned for 5 minutes at room temperature and at 1000 revolutions per minute. Collectors were added as shown in Table I below, and the pH was adjusted to 9.5 by adding an aqueous 5% NaOH solution. After conditioning for 5 minutes air was blown through the pulp, and a rougher flotation was carried out. The froth product was removed, and then cleaned 3 times by repeated flotation at a pH from 9.0–9.2. The collector reagents used and the results obtained are shown in Table I.

The following were used as the collector reagents.

A: Tall oil fatty acid mixture

B: Tall oil fatty acid monoester of maleic acid, $$R\overset{O}{\overset{\|}{C}}OC_2H_4O\overset{O}{\overset{\|}{C}}CH{=}CH\overset{O}{\overset{\|}{C}}OOH;\ R\overset{O}{\overset{\|}{C}}$$

is tall oil fatty acids

C: Mixture of A and B in a weight ratio of 1:11

TABLE I

| | Collector | Collector g/t | Weight Ratio | Rougher Concentrate $P_2O_5$ Assay % | Rougher Concentrate $P_2O_5$ Yield % | Concentrate $P_2O_5$ Assay % | Concentrate $P_2O_5$ Yield % |
|---|---|---|---|---|---|---|---|
| Controls | | | | | | | |
| 1 | Tall oil fatty acid | 400 | | 24.2 | 88.1 | 34.1 | 72.6 |
| 2 | 1:11 weight ratio mixture of tall oil fatty acids and monotall oil fatty ester of maleic acid | 320 | 1:11 | 27.9 | 90.0 | 35.4 | 77.5 |
| Examples | | | | | | | |
| 1 | Tall oil fatty acid | 60 | 1:4.3 | 27.9 | 93.0 | 35.3 | 81.7 |
| | $R\overset{O}{\overset{\|}{C}}OC_2H_4O\overset{O}{\overset{\|}{C}}CH{=}CH\overset{O}{\overset{\|}{C}}OOH$ | 260 | | | | | |
| 2 | Tall oil fatty acid | 120 | 1:1.8 | 27.7 | 95.3 | 35.0 | 88.4 |
| | $R\overset{O}{\overset{\|}{C}}OC_2H_4O\overset{O}{\overset{\|}{C}}CH{=}CH\overset{O}{\overset{\|}{C}}OOH$ | 200 | | | | | |
| 3 | Tall oil fatty acid | 180 | 1.4:1 | 26.6 | 95.0 | 34.0 | 87.5 |
| | $R\overset{O}{\overset{\|}{C}}OC_2H_4O\overset{O}{\overset{\|}{C}}CH{=}CH\overset{O}{\overset{\|}{C}}OOH$ | 140 | | | | | |

The data show that the combinations of collector reagents in weight ratios in accordance with the invention, exemplified by tall oil fatty acids and monotall oil ester of maleic acid, results in a concentrate with a higher assay and/or yield than the Controls.

EXAMPLES 4 AND 5

Ground Florida type phosphate ore in an amount of 507 grams (dry weight 480 grams) and containing 8.8% $P_2O_5$ as well as silicate minerals was placed in a 1-liter flotation cell, and conditioned at room temperature for 5 minutes together with 0.5 liter of water and 0.45 gram of water glass (40%). The collector shown in Table II and diesel oil were added in the amounts shown, and the pulp was conditioned for another 5 minutes. Two drops of a foamer (MIBC) and 0.8 liter of water were added, and air was blown through the pulp. The foam product was cleaned twice by repeated flotation in the same cell. The collectors used and the results are shown in Table II.

The following collector reagents were used:

A: Tall oil fatty acid mixture

B: Tall oil fatty acid monoester of maleic acid, $$R\overset{O}{\overset{\|}{C}}OC_2H_4O\overset{O}{\overset{\|}{C}}CH{=}CH\overset{O}{\overset{\|}{C}}OOH,\ R\overset{O}{\overset{\|}{C}}$$

is tall oil fatty acids

C: Diesel oil

D: Mixture of A and B in a weight ratio of 1:11

TABLE II

| | Collector | Collector g/t | Weight Ratio | Flotation Time (minutes) | Rougher Concentrate $P_2O_5$ Assay % | Rougher Concentrate $P_2O_5$ Yield % | Concentrate $P_2O_5$ Assay % | Concentrate $P_2O_5$ Yield % |
|---|---|---|---|---|---|---|---|---|
| Controls | | | | | | | | |
| 1 | Tall oil fatty acid | 145 | | 5 | 27.8 | 97.0 | 30.6 | 94.0 |
| | Diesel oil | 325 | | | | | | |
| 2 | 1:11 weight ratio mixture of Tall oil fatty acids and monotall oil fatty ester of maleic acid | 146 | | 6 | 29.8 | 90.7 | 32.5 | 86.9 |
| | Diesel oil | 325 | | | | | | |

TABLE II-continued

| | Collector | Collector g/t | Weight Ratio | Flotation Time (minutes) | Rougher Concentrate $P_2O_5$ Assay % | Rougher Concentrate $P_2O_5$ Yield % | Concentrate $P_2O_5$ Assay % | Concentrate $P_2O_5$ Yield % |
|---|---|---|---|---|---|---|---|---|
| Examples | | | | | | | | |
| 4 | Tall oil fatty acid | 73 | 1:1:4.5 | 4 | | | | |
| | 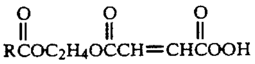 | 73 | | | 29.6 | 96.8 | 32.5 | 94.2 |
| | Diesel oil | 325 | | | | | | |
| 5 | Tall oil fatty acid | 88 | | 4 | | | | |
| | 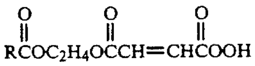 | 58 | | | 29.3 | 96.2 | 32.3 | 93.5 |
| | Diesel oil | 325 | | | | | | |

The results show that concentrates obtained in accordance with the invention have higher assays $P_2O_5$ and higher yields than the concentrates from the Controls.

EXAMPLES 6 TO 11

A carbonate-bearing ore containing 27.8% by weight of $CO_2$ in an amount of 1 kg was ground together with 0.8 kg of water until 95% of the material had a particle size less than 209 μm. The pulp was then deslimed twice, and the wet ore was placed in a flotation cell together with 1.2 kg of water and 200 mg water glass (40%), whereafter the pulp was conditioned at room temperature for 5 minutes. Collectors were added as shown in Table III, and after conditioning for 5 minutes rougher flotation was carried out. The collector reagents used and the results obtained are shown in Table III.

The following components were included in the collector reagents.

A: Tall oil fatty acid mixture

B: Tall oil fatty acid monoester of maleic acid,

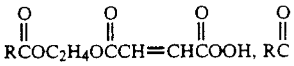

is tall oil fatty acids

C: Mixture of A and B in a weight ratio of 1:11

TABLE III

| | Collector | Collector g/t | Weight Ratio | Concentrate $CO_2$ Assay % | Concentrate $CO_2$ Yield % |
|---|---|---|---|---|---|
| Controls | | | | | |
| 1 | 1:11 weight ratio mixture of Tall oil fatty acids and monotall oil fatty ester of maleic acid | 150 | | 28.54 | 20.58 |
| 2 | 1:11 weight ratio mixture of Tall oil fatty acids and monotall oil fatty ester of maleic acid | 250 | | 31.71 | 39.98 |
| 3 | 1:11 weight ratio mixture of Tall oil fatty acids and monotall oil fatty ester of maleic acid | 350 | | 33.71 | 67.76 |
| 4 | Tall oil fatty acid | 150 | | 30.47 | 10.31 |
| 5 | Tall oil fatty acid | 250 | | 31.29 | 20.81 |
| 6 | Tall oil fatty acid | 350 | | 31.31 | 30.76 |
| Examples | | | | | |
| 6 | Tall oil fatty acid | 75 | 1:1 | 30.19 | 24.02 |
| | 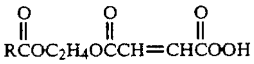 | 75 | | | |
| 7 | Tall oil fatty acid | 125 | 1:1 | 34.61 | 49.84 |
| | 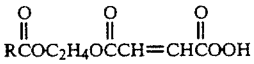 | 125 | | | |
| 8 | Tall oil fatty acid | 175 | 1:1 | 43.33 | 96.42 |
| | 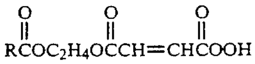 | 175 | | | |
| 9 | Tall oil fatty acid | 175 | 3.6:1 | 31.58 | 31.94 |

TABLE III-continued

| | Collector | Collector g/t | Weight Ratio | Concentrate $CO_2$ Assay % | Yield % |
|---|---|---|---|---|---|
| | $R\overset{O}{\overset{\|}{C}}OC_2H_4O\overset{O}{\overset{\|}{C}}CH=CH\overset{O}{\overset{\|}{C}}OOH$ | 45 | | | |
| 10 | Tall oil fatty acid | 175 | 2.4:1 | 31.46 | 57.56 |
| | $R\overset{O}{\overset{\|}{C}}OC_2H_4O\overset{O}{\overset{\|}{C}}CH=CH\overset{O}{\overset{\|}{C}}OOH$ | 75 | | | |
| 11 | Tall oil fatty acid | 245 | 2.2:1 | 32.11 | 90.28 |
| | $R\overset{O}{\overset{\|}{C}}OC_2H_4O\overset{O}{\overset{\|}{C}}CH=CH\overset{O}{\overset{\|}{C}}OOH$ | 105 | | | |

The data show that the collector in accordance with the invention gave essentially higher yields and assays than the Controls, at the same dosage levels.

Having regard to the foregoing disclosure, the following is claimed as the inventive and patentable embodiments thereof:

1. A froth flotation collector composition for the flotation of alkaline earth metal-containing oxide minerals and salt minerals comprising, in combination:

(1) a monoester of a dicarboxylic acid of the general formula $$R'\underset{\underset{O}{\|}}{C}OA\underset{\underset{O}{\|}}{C}R''\underset{\underset{O}{\|}}{C}OH$$

in which R' is an aliphatic hydrocarbon group with 7-21 carbon atoms, R'' is a hydrocarbon radical with 2-6 carbon atoms and A is an alkylene oxide group derived from an alkylene oxide with 2-4 carbon atoms; and (2) a monocarboxylic acid having the general formula $$R'''COOH$$

wherein R''' is a hydrocarbon group with 5-23 carbon atoms; the acid being in an amount to increase the yield or the selectivity of the monoester or both in the flotation of alkaline earth metal-containing oxide and salt type minerals, the monoester and the monocarboxylic acid being in a weight ratio within the range from about 1:15 to about 9:1.

2. A froth flotation collector composition according to claim 1 in which the monocarboxylic acid is an aliphatic monocarboxylic acid.

3. A froth flotation collector composition according to claim 2 in which the aliphatic monocarboxylic acid is saturated.

4. A froth flotation collector composition according to claim 2 in which the aliphatic monocarboxylic acid is unsaturated.

5. A froth flotation collector composition according to claim 2 in which the aliphatic monocarboxylic acid is mixed tall oil fatty acids.

6. A froth flotation collector composition according to claim 1 in which A is oxyethylene.

7. A froth flotation collector composition according to claim 1 in which R'' is —CH═CH— or phenylene —$C_6H_4$—.

8. A froth flotation collector composition according to claim 1 which also contains a water-insoluble secondary collector reagent.

9. A froth flotation collector composition according to claim 1 in which R''' is an aliphatic group having from 10 to 18 carbon atoms.

10. A froth flotation collector composition according to claim 1 in which the weight ratio is from 1:7 to 6:1.

11. A process for the froth flotation of alkaline earth metal-containing oxide minerals and salt minerals which comprises carrying out the froth flotation in the presence as a collector reagent of (1) a monoester of a dicarboxylic acid having the general formula $$R'\underset{\underset{O}{\|}}{C}OA\underset{\underset{O}{\|}}{C}R''\underset{\underset{O}{\|}}{C}OH$$

in which R' is aliphatic hydrocarbon having from seven to twenty-one carbon atoms, R'' is hydrocarbon having from two to six carbon atoms and A is oxyalkylene having from two to four carbon atoms; and (2) a monocarboxylic acid having the general formula $$R'''COOH$$

wherein R''' is a hydrocarbon group with 5-23 carbon atoms; the acid being in an amount to increase the yield or the selectivity of the monoester or both in the flotation, the weight ratio of the monoester of a dicarboxylic acid to the monocarboxylic acid being within the range from about 1:15 to about 9:1.

12. A process according to claim 11 in which A is oxyethylene.

13. A process according to claim 11 in which R'' is —CH═CH— or phenylene —$C_6H_4$—.

14. A process according to claim 11 in which the collectors are used in conjunction with a water-insoluble polar secondary collector reagent.

15. A process according to claim 14 in which the water-insoluble polar secondary collector reagent is an alkylene oxide adduct having the formula:

$$R_3(A)_{p1}OH$$

in which $R_3$ is hydrocarbon having from eight to twenty two carbon atoms, A is oxyalkylene derived from an alkylene oxide having from two to four carbon atoms and $p_1$ is a number from 1 to 6.

16. A process according to claim 15 in which $R_3$ is aliphatic or alkylaryl.

17. A process according to claim 14 in which the polar secondary collector reagent is an ester having the formula:

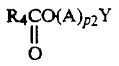

in which $R_4$ is hydrocarbon having from seven to twenty one carbon atoms, A is oxyalkylene derived from an alkylene oxide having from two to four carbon atoms, $p_2$ is a number from 0 to 6, and Y is alkyl having from one to four carbon atoms or hydrogen, provided that Y cannot be hydrogen when $p_2$ is zero.

18. A process according to claim 11 in which the monocarboxylic acid is an aliphatic monocarboxylic acid.

19. A process according to claim 18 in which the aliphatic monocarboxylic acid is saturated.

20. A process according to claim 18 in which the aliphatic monocarboxylic acid is unsaturated.

21. A process according to claim 18 in which the aliphatic monocarboxylic acid is mixed tall oil fatty acids.

22. A process according to claim 18 in which A is oxyethylene.

23. A process according to claim 18 in which R is $—CH═CH—$ or phenylene $—C_6H_4—$.

24. A process according to claim 18 which also contains a water-insoluble secondary collector reagent.

25. A process according to claim 11 in which R''' is an aliphatic group having from 10 to 18 carbon atoms.

26. A process according to claim 11 in which the weight ratio is from 1:7 to 6:1.

* * * * *